Patented July 5, 1927.

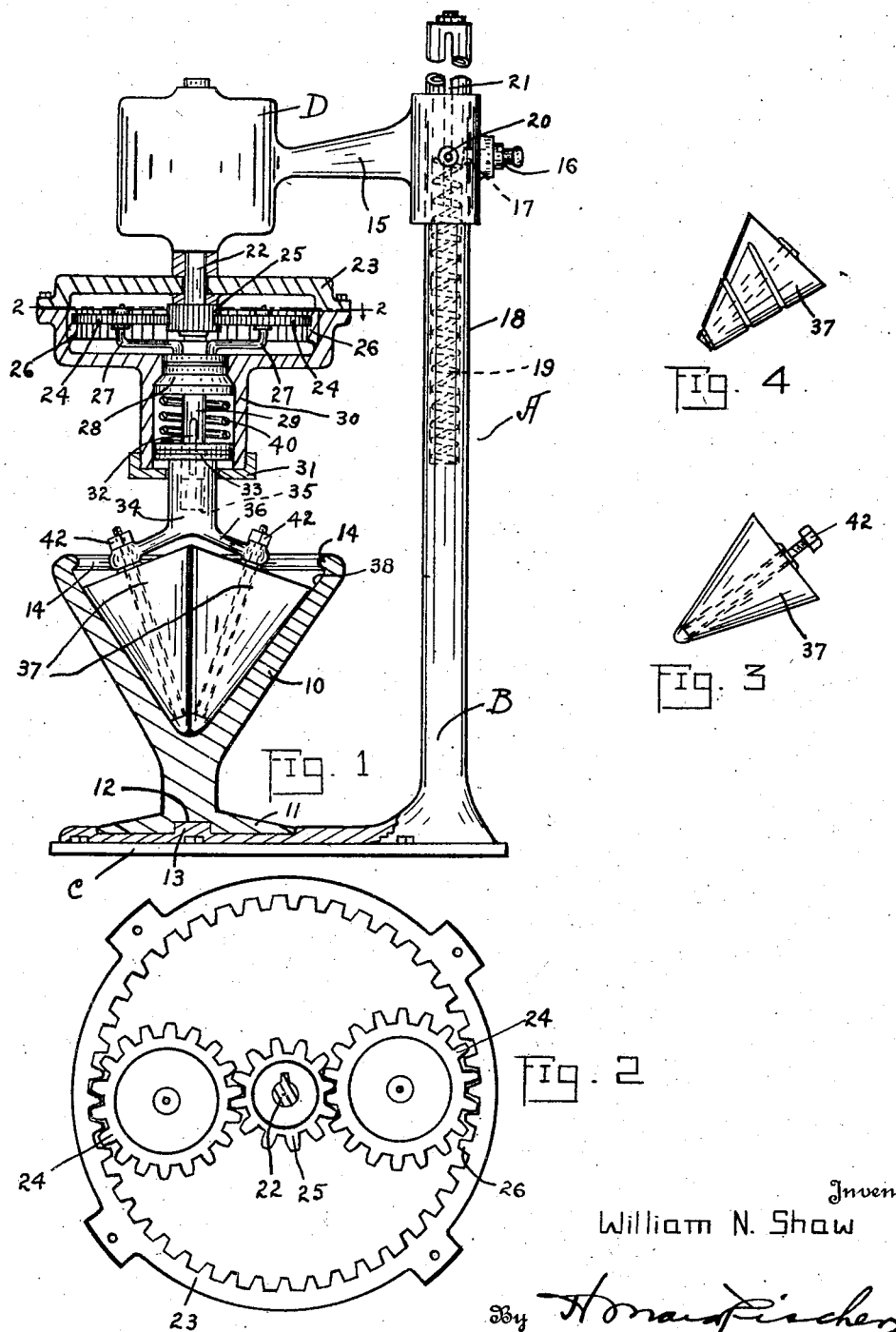

1,634,563

UNITED STATES PATENT OFFICE.

WILLIAM N. SHAW, OF FARGO, NORTH DAKOTA.

DRUG MIXER.

Application filed November 5, 1925. Serial No. 66,999.

My invention relates to a drug mixer wherein it is desired to provide means for the druggist to more thoroughly mix the drugs and medical compounds so that the finished drug in a prescription is more thoroughly and carefully mixed than where it is done by hand. It is quite important in various medicines to thoroughly mix the ingredients of the same together and often this is neglected by reason of the fact that the druggist is busy and does not have a sufficient time to carefully mix the medicine together.

A feature of the invention resides in means for thoroughly and completely mixing the drugs in a mixing mortar so that when the mixer has operated a certain length of time, the ingredients placed in the mortar are thoroughly and completely mixed or combined together, so as to give a more uniform consistency to the same. This is accomplished by a mixing device having a pair of mixers of a conical shape and adapted to operate in a conical mortar in a manner to rotate in the mortar and thereby thoroughly and completely mix the ingredients within the same.

The invention also includes means formed in the conical mixers so as to have a tendency to work the drugs toward the mortar rather than out of the same during the rotation of the mixers. The grooving is only necessary in a certain class of mixers and my invention can be used as a mixer without this grooved means.

My invention includes a mixer wherein a unit is provided adapted to hold the mortar in place against rotation and to permit the mortar to be separated from the mixing members so that the mortar can be thoroughly cleansed when it is desired and means whereby the mixers can be raised out of engagement with the mortar.

I include in my invention removable mixing members so that different mixers can be easily and readily applied and so that the mixers can be interchanged which permits the removing of the conical mixers so that they can be cleansed or replaced if it is desired.

These features together with other details of construction will be more fully and clearly set forth in the specification and claims in the following description.

In the drawings forming part of my specification,

Figure 1 is a side view of my mixer, partly illustrated in cross section to disclose the detail of construction of the same.

Figure 2 is a section on the line 2—2 of Figure 1.

Figure 3 illustrates one of the conical mixers removed from the operating mixer.

Figure 4 is an alternative view of one of the mixers with the directing grooves formed therein.

In the drawings my drug mixer A is provided with a supporting standard B which projects upwardly from the base portion C and which is adapted to slidably support the operating motor D.

The mixer A is of a simple construction with the parts arranged in a manner so as to be conveniently placed upon the mixing counter of a drug or pharmacist laboratory or any other laboratory where it is desired to mix ingredients and drugs in a manner so as to save time for the druggist or the chemist. The mixer A can be made of any suitable size, but ordinarily is of a small nature and adapted particularly for use for pharmacists to mix medicines and other ingredients in the pharmacist's laboratory.

The base C is adapted to support the conical shaped mortar 10 which is provided with a base 11 formed with a recessed square or angular socket 12 into which the lug of a similar shape 13 projects so as to hold the mortar 10 stationary and against rotation when in position upon the base C. The mortar 10 is of a conical inner shape and is provided with an annular flange 14 about the top so as to hold the ingredients within the same.

My mixer is adapted to support the motor D by the slidable bracket 15 which is held in operative position by the spring catch 16, this catch having an ordinary construction and adapted to engage in a suitable notch 17 formed in the standard 18 of the mixer A.

A coil spring 19 positioned within the standard 18 is adapted to bear against the pin 20 which is carried by the bracket 15. The spring 19 assists in raising the motor D when the catch 16 is disengaged from the notch 17, while the pin 20 extends through the slot 21 formed in the standard 18, so as to hold the motor in alinement with the mortar 10. This permits the shaft 22 of the motor D to be positioned practically coaxial with the center of the mortar 10.

The motor D is adapted to support a housing 23 in which gear pinions 24 are positioned and which are adapted to mesh with the pinion 25 carried by the shaft 22. The pinions 24 mesh with the internal annular gear 26 formed in the lower portion of the housing 23, so that when the motor D operates the pinion 25 is rotated and the pinions 24 are adapted to be caused to be rotated about the housing 23.

Connected to each of the pinions 24 I provide arms 27 which extend inwardly and connect with the head 28 formed on the shaft 29. The shaft 29 is positioned in a depending tubular portion 30, formed extending centrally from the lower portion of the casing 23 and is adapted to be closed by the nut 31 threaded to the bottom of the same.

The shaft 29 is provided with a key 32 which slidably engages in a suitable key recess formed in the enlarged end 33 of the bracket 34. The bracket 34 is formed with a socket or opening 35 into which the end of the shaft 29 which carries the key 32 is adapted to slide. The bracket 34 is bifurcated to form supporting ends 36 which are adapted to removably support the conical mixers 37. The mixers 37 are adapted to bear against the inner surface 38 of the mortar 10.

Thus when the motor D operates, the shaft 22 will operate the pinions 24 to carry the same about in the casing 23 and through the operating arms 27, cause the shaft 29 to rotate and thereby cause the bracket 34 to rotate and carry the mixers 37 to rotate over the surface 38 of the mortar 10. In this manner the ingredients placed within the mortar can be thoroughly and completely mixed.

To facilitate the more effective operation of the mixers 37, I provide a coil spring 40 positioned between the head 28 and the enlarged portion 33 of the bracket 34 so as to hold the conical mixers 37 bearing under spring tension against the mixing surface 38 of the mortar 10. This spring 40 compensates for inequalities of material within the mortar 10 so that the ingredients within the mortar will be thoroughly mixed and the mixing members 37 can operate over the material without binding in the rotation and operation of the same.

Either of the mixing members 37 can be removed by the thumb nut 42 so that the mixing members 37 can be changed or replaced at any time, or taken off for cleaning if it is desired.

In the mixer 37 illustrated in Figure 4, I have shown a series of grooves running about the same which are designed to cause the material to be forced downward in the mortar to prevent the same from working up out of the mortar when it is being mixed. In other words, these grooves keep the material from slipping upward by reason of the pressure of the mixers in the mortar and have a tendency to force the material down to the lowest point in the mortar. It is obvious that these grooves or serrations or formations in the mixers 37 can be of any suitable design and shape so as to accomplish the purpose of holding the material down in the mortar while it is being mixed.

In operation the motor D is pushed down on the standard 18 until the catch 16 engages in the notch 17 and then is operated to cause the conical members 37 to rotate about in the mortar. The mortar 10 is held against rotation by the lug 13 and when the ingredients within the same are thoroughly mixed, by releasing the catch 16 the motor D with the mixers 37 are elevated by the spring 19 and the mortar 10 can be removed from the base C. It is quite obvious that a mixer of this nature is desirable in a pharmacy or in a laboratory where considerable mixing is done and where the druggist or chemist may necessarily need to be doing other things while the mixing is in progress. This mixer accomplishes these results.

The ingredients placed within the mortar and mixed by the members 37 are uniformly combined together, whereas, in ordinary hand mixing by the druggist, which in many instances is a long tedious operation, the extent of mixing depends entirely upon the effort of the druggist or operator mixing the drugs or ingredients. Therefore, it is quite apparent that a mixer of this kind is most desirable, not only as a saver of time, but also in providing a more efficient means of combining ingredients together where a mortar mixer of this nature is desired.

In accordance with the patent statutes I have described the principles of operation of my mixer and while I have illustrated a particular formation and construction in my drawings, I desire to have it understood that these are only illustrative and that the invention can be carried out by other means and applied to uses other than those above set forth within the scope of the following claims.

I claim:

1. A drug mixer including, a standard, a mortar adapted to be supported by said standard, an electric motor slidably supported on said standard and contacting mixing members adapted to be operated and supported by said motor in a manner to be moved into and out of operation on the standard to provide a mixer for drugs and articles of a similar nature.

2. A mixer including, contacting rollers associated with a mortar adapted to rotate by electrical propulsion to mix ingredients thoroughly together within the mortar and means whereby the mortar and mixing members may be separated to permit the ingredients within the mortar to be removed or placed therein.

3. A drug mixer comprising an electric motor, a standard for slidably supporting said motor, a transmission associated with said motor and carried thereby, a mixer comprising contacting cone shaped rollers associated with said transmission, a mortar in which said mixer is adapted to operate and resilient means in said transmission adapted to cause said mixer to bear in said mortar under spring tension to provide compensating means for inequalities in the operation of said mixer in the mortar.

4. A drug mixer including, an electric motor, an operating transmission associated with said motor, a pair of contacting mixing members connected with said transmission in a manner to cause said mixing members to be operated when said motor is operated, a receiving mortar, means for holding said mortar operatively associated with said mixing members and means for causing said mixing members to bear within said mortar under spring tension when in operation.

5. A drug mixer including, a mortar, conical contacting mixing members adapted to be operated in said mortar in a manner to thoroughly and completely mix ingredients placed within said mortar, and motor means adapted to operate said mixers for the purposes specified.

6. A drug mixer including, an electric motor, a standard for slidably supporting said motor, spring means for elevating said motor on said standard, a spring catch for holding said motor in operative position, a mortar associated with said standard and held axial in relation to said motor, mixing members adapted to bear against the inner surface of said mortar and against each other and transmission means associated between said mortar and said mixing members adapted to cause said mixers to operate about said mortar and to compensate for inequalities in the operation of the same to prevent binding and to permit said members to thoroughly mix ingredients within said mortar.

7. A drug mixer including, a motor, a transmission associated with said motor, contacting mixing members connected to said transmission, a mixing bowl, means for holding said mixing bowl associated with said mixing members in a manner so that said mixing members will travel over the inner surface of said mixing bowl in the operation of said motor to work and thoroughly mix ingredients placed in said mixing bowl, by the contacting of the mixing members over the surface of said mixing bowl and against each other.

WILLIAM N. SHAW.